(12) United States Patent
Riibe (10) Patent No.: US 8,465,041 B2
(45) Date of Patent: Jun. 18, 2013

(54) MEANS FOR ELECTRICALLY CONNECTING A VEHICLE ELECTRICAL SYSTEM TO A TRAILER

(76) Inventor: Gary Riibe, Herman, NE (US)

(*) Notice: Subject to any disclaimer, the term of this patent is extended or adjusted under 35 U.S.C. 154(b) by 0 days.

(21) Appl. No.: 13/537,486

(22) Filed: Jun. 29, 2012

(65) Prior Publication Data

US 2012/0261901 A1 Oct. 18, 2012

Related U.S. Application Data

(62) Division of application No. 12/800,347, filed on May 13, 2010, now Pat. No. 8,308,181.

(51) Int. Cl.
*B60D 1/62* (2006.01)

(52) U.S. Cl.
CPC ..................... *B60D 1/62* (2013.01)
USPC ............................ 280/422; 280/433; 340/431

(58) Field of Classification Search
USPC ..................... 280/433, 422, 420; 340/431
See application file for complete search history.

(56) References Cited

U.S. PATENT DOCUMENTS

| 1,805,642 | A | * | 5/1931 | Strachan | 280/422 |
| 1,926,264 | A | * | 9/1933 | Connors | 280/422 |
| 2,118,884 | A | * | 5/1938 | Fuchs | 165/253 |
| 3,181,887 | A | * | 5/1965 | Boylan et al. | 280/421 |
| 3,833,928 | A | | 9/1974 | Gavit et al. | |
| 5,434,552 | A | | 7/1995 | Ems | |
| 5,558,350 | A | * | 9/1996 | Kimbrough et al. | 280/426 |
| 6,222,443 | B1 | | 4/2001 | Beeson et al. | |
| 7,581,746 | B2 | | 9/2009 | Abate et al. | |
| 2002/0050698 | A1 | * | 5/2002 | Dippenaar | 280/422 |
| 2007/0176394 | A1 | * | 8/2007 | Gehring et al. | 280/420 |

* cited by examiner

*Primary Examiner* — Paul N Dickson
*Assistant Examiner* — Maurice Williams
(74) *Attorney, Agent, or Firm* — Dennis L. Thomte; Thomte Patent Law Office LLC (57) ABSTRACT

A means for electrically connecting a vehicle electrical system to a trailer is disclosed which automatically connects the same when the hitch of the trailer is mounted on the vehicle hitch. Four different embodiments of the invention are disclosed.

1 Claim, 10 Drawing Sheets

MEANS FOR ELECTRICALLY CONNECTING A VEHICLE ELECTRICAL SYSTEM TO A TRAILER

CROSS REFERENCE TO RELATED APPLICATION

This is a Divisional Application based on application Ser. No. 12/800,347, filed May 13, 2010 now U.S. Pat. No. 8,308, 181, entitled MEANS FOR ELECTRICALLY CONNECTING A VEHICLE ELECTRICAL SYSTEM TO A TRAILER.

BACKGROUND OF THE INVENTION

1. Field of the Invention

This invention relates to a means for electrically connecting a vehicle electrical system to a trailer and more particularly to a means for electrically connecting a vehicle electrical system to a trailer by means of the hitch connection therebetween.

2. Description of the Related Art

Trailers normally have a lighting system provided thereon for rear lights, turn signal lights and brake lights. Normally, the lights of the trailer are connected to the electrical system of the towing vehicle by means of leads from the trailer being connected to leads from the vehicle's electrical system. Frequently, the driver of the vehicle forgets to disconnect the leads between the trailer and vehicle electrical system and pulls the same apart after the trailer has been disconnected from the vehicle hitch. Further, sometimes the leads of the trailer lights become inadvertently disconnected from the leads of the vehicle electrical system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one embodiment of the invention, wherein the vehicle has a trailer hitch which extends rearwardly therefrom and which has a hitch ball mounted on the horizontally extending portion thereof, the means for connecting the electrical system of the vehicle to the lights of the trailer comprises a first support which is vertically movably secured to the horizontally extending portion of the hitch with a first contactor, having upper and lower ends, extending rearwardly from the first support and having electrical contacts at the upper end thereof. The electrical contacts extend around the hitch ball with the electrical contacts of the first contactor being electrically connected to the vehicle electrical system. A hitch ball coupler is provided at the forward end of the trailer for receiving the hitch ball therein. A second support is operatively secured to the hitch ball coupler and has rearward and forward ends. A second, semi-ring shaped contactor, having rearward and forward ends, is provided with the rearward end of the second contactor being pivotally secured, about a horizontal axis, to the second support. A spring means is operatively secured to the second contactor which yieldably urges the forward end thereof in a downward direction. The second contactor has electrical contacts thereon which electrically contact the electrical contacts of the first contactor when the hitch ball is received by the hitch ball coupler to supply electrical power to the trailer from the vehicle. In the preferred embodiment, a spring means is associated with the first support to yieldably urge the first support upwardly with respect to the horizontally extending portion of the vehicle trailer hitch.

In a second embodiment, a means is disclosed for electrically connecting the vehicle electrical system to the trailer lights of a trailer wherein the vehicle has a fifth wheel mounted thereon and the trailer has a downwardly extending kingpin mounted thereon. In that embodiment, a semi-ring shaped first contactor with electrical contacts thereon is secured to the fifth wheel of the vehicle with the electrical contacts of the first contactor being electrically connected to the vehicle electrical system. In that embodiment, a second electrical contactor is mounted on the kingpin of the trailer which is moved into engagement with the electrical contacts on the first contactor when the kingpin of the trailer is received by the fifth wheel of the vehicle. In a third embodiment, a means is provided for transmitting electrical power from the vehicle electrical system to the trailer through a gooseneck hitch structure. In that embodiment, a first contactor is mounted on the upstanding hitch ball which is secured to the bed of the vehicle and which is yieldably moved upwardly with respect thereto by a spring means. In this embodiment, a second contactor is positioned within the downwardly extending portion of the gooseneck hitch of the trailer which is moved into engagement with the first contact when the trailer gooseneck hitch is mounted on the upstanding ball structure. A fourth embodiment is also disclosed which is a modified form of the first embodiment.

A principal object of the invention is to provide an improved means for electrically connecting a vehicle electrical system to a trailer.

It is also a principal object of the invention to provide an improved means for transferring electrical power from a vehicle electrical system to the electrical system of a trailer.

A further object of the invention is to provide a means of the type described which may be used in gooseneck hitch structures, fifth wheel hitch structures and conventional hitch structures.

A further object of the invention is to provide means of the type described which does not require extensive modification of the trailer or vehicle.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional vehicle receiver hitch having a horizontally disposed portion 12 at the rearward end thereof. Hitch ball 14 is mounted on the horizontally disposed portion 12 in conventional fashion. The numeral 16 refers to a conventional coupler 16 located at the forward end of a trailer hitch.

Figure 1:
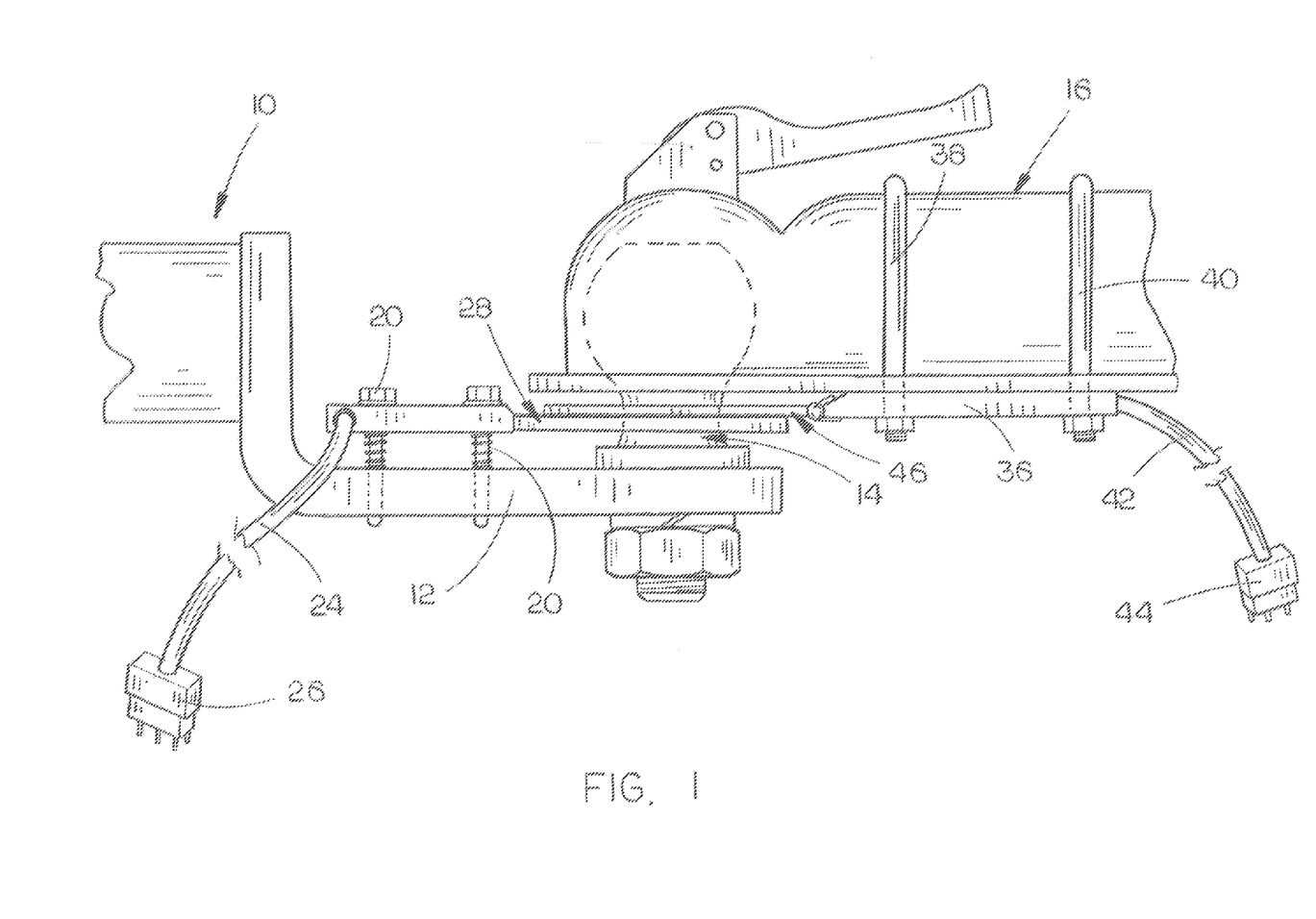
FIG. 1 is a partial side view of the first embodiment of the invention illustrating a trailer coupler being received on a hitch ball with the coupler and vehicle hitch having mating contactor elements for transmitting electrical power from the vehicle to the trailer.
Figure 2:
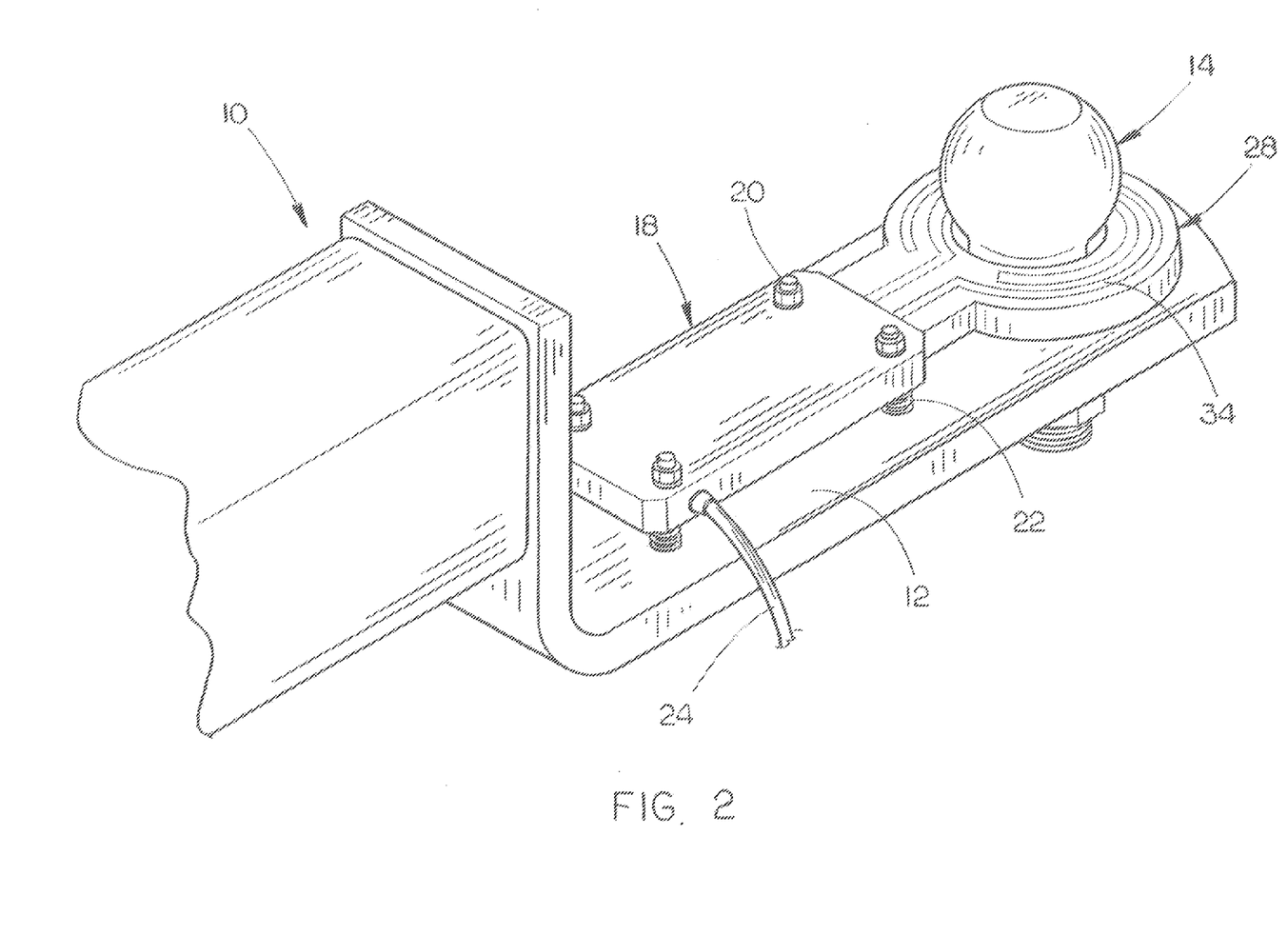
FIG. 2 is a front perspective view of the apparatus of FIG. 1.
Figures 3, 3A:
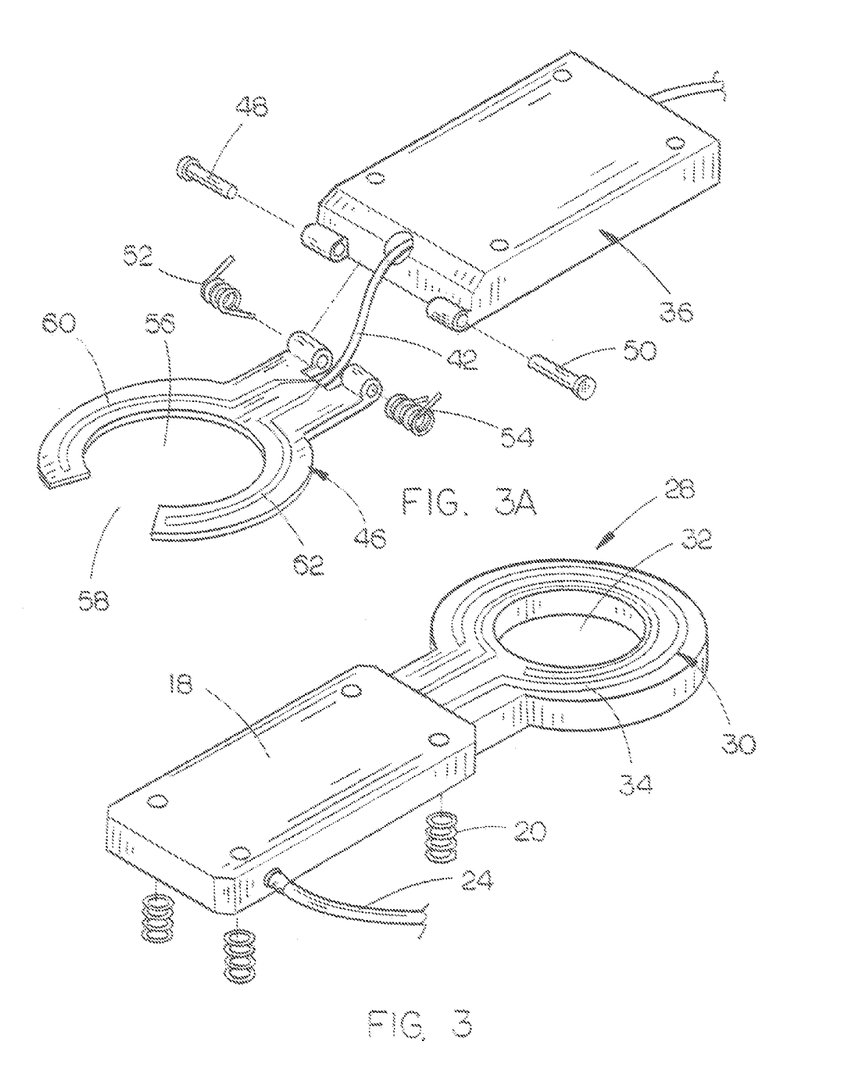
FIG. 3 is an exploded perspective view of the apparatus of FIG. 1.

A block or plate 18 is vertically movably mounted on portion 12 of hitch 10 by four bolts 20 having springs 22 mounted thereon between plate 18 and portion 12 which yieldably urge plate 18 upwardly from portion 12. Lead 24 extends inwardly into plate 18 as seen in FIGS. 1-3. The forward end of lead 24 has a plug connector 26 thereon which is electrically connected to the electrical system of the vehicle. Contactor plate 28 extends rearwardly from plate 18 and includes a ring-shaped contactor portion 30 having a central opening 32 formed therein. Electrical contacts 34 are embedded into the upper surface of contactor portion 30 and contactor plate 28 and are electrically connected to the electrical wires in lead 24.

Figure 4:
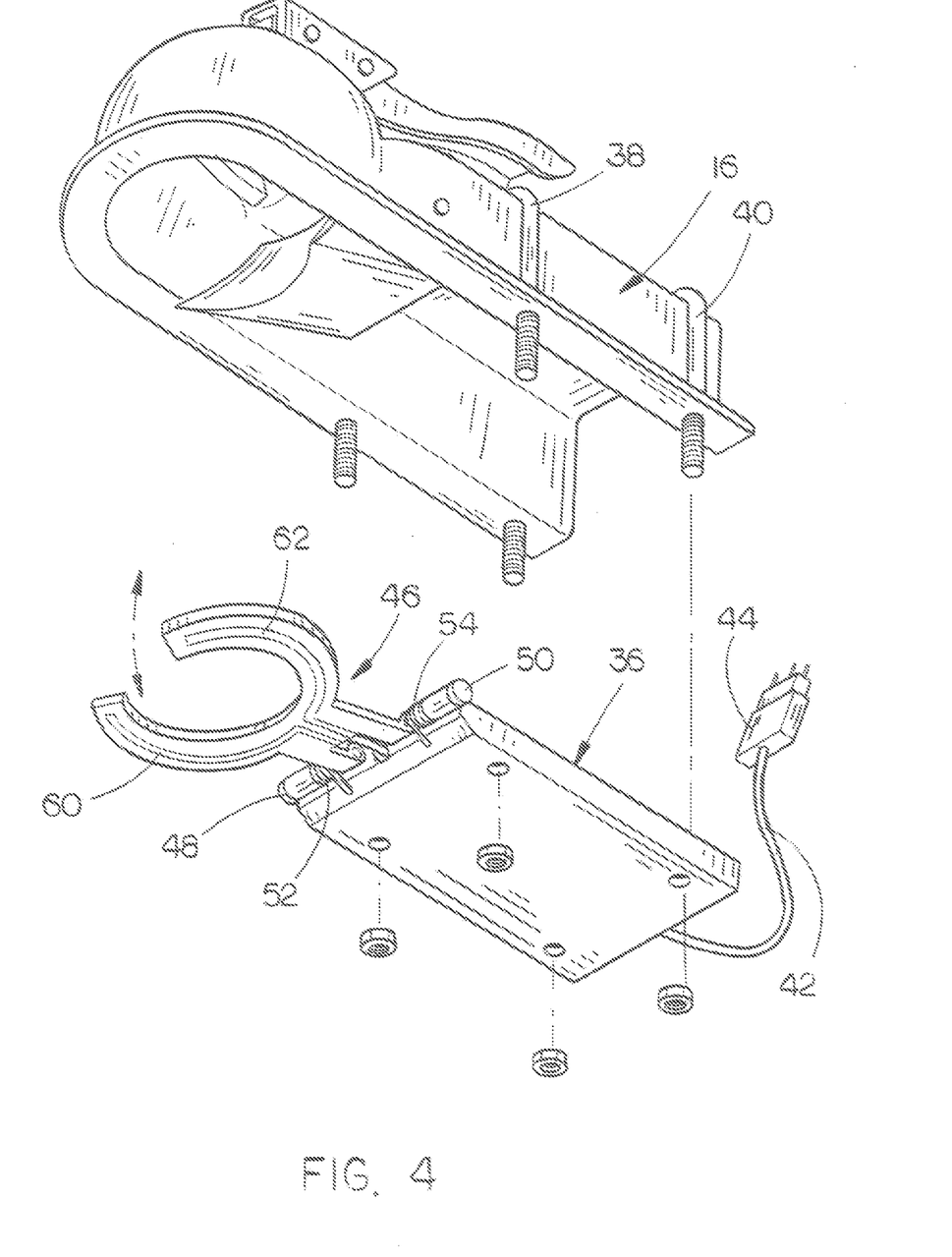
FIG. 4 is a perspective view of that portion of the apparatus of FIG. 1 which is secured to the trailer coupler.

Support plate 36 is bolted to coupler 16 by U-bolts 38 and 40 and has a lead 42 extending into the rearward end thereof. Plug 44 of lead 42 is connected to the trailer lights and brakes if the trailer has electrically actuated brakes. The rearward end of contactor 46 is hingedly secured to the forward end of plate 36 by pins 48 and 50. Springs 52 and 54 are mounted on pins 48 and 50 respectively and yieldably urge the forward end of contactor 46 downwardly. Contactor 46 has a central opening 56 and an opening 58 at its forward end. Electrical contacts 60 and 62 are embedded in contactor 46 and are in electrical contact with the electrical wires in lead 42.

When coupler 16 is lowered onto hitch bolt 14, contacts 60 and 62 are in electrical contact with contacts 34 on contactor plate portion 30 of contactor 28 so that electrical current is supplied to the trailer by way of lead 24, contacts 34, contacts 60 and 62 and lead 42. Springs 52 and 54 not only urge contactor 46 downwardly towards contactor 28 but also permit the coupler 16 to pivot about a horizontal axis with respect to the hitch 10. Springs 20 not only urge contactor 28 downwardly toward contactor 46 but also permit hitch 10 to move about a horizontal axis with respect to coupler 16.

Figure 5:
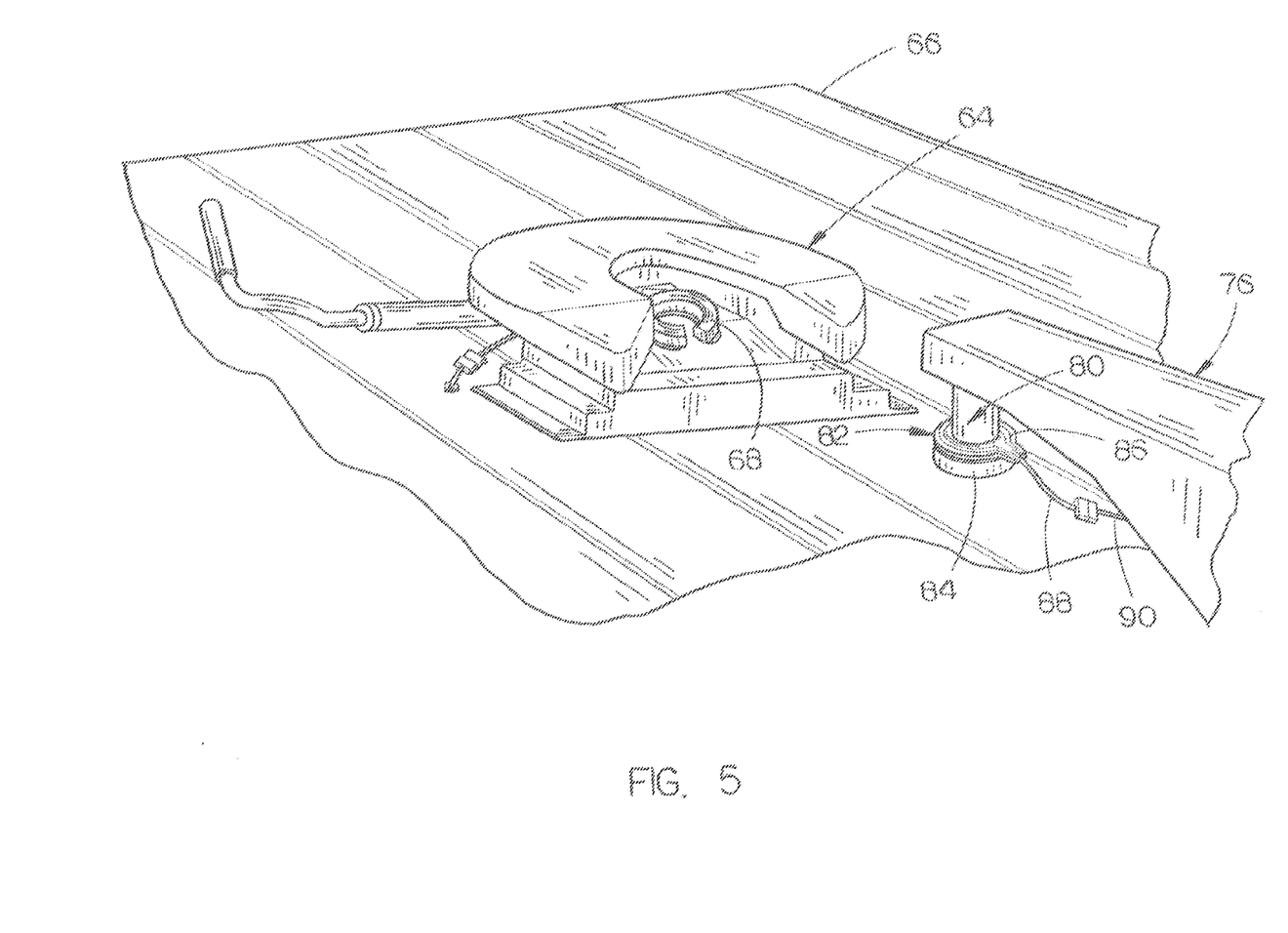
FIG. 5 is a perspective view illustrating the second embodiment of the invention being employed to transfer electrical power from a vehicle having a fifth wheel to a trailer having a kingpin which is received by the fifth wheel.
Figure 6:
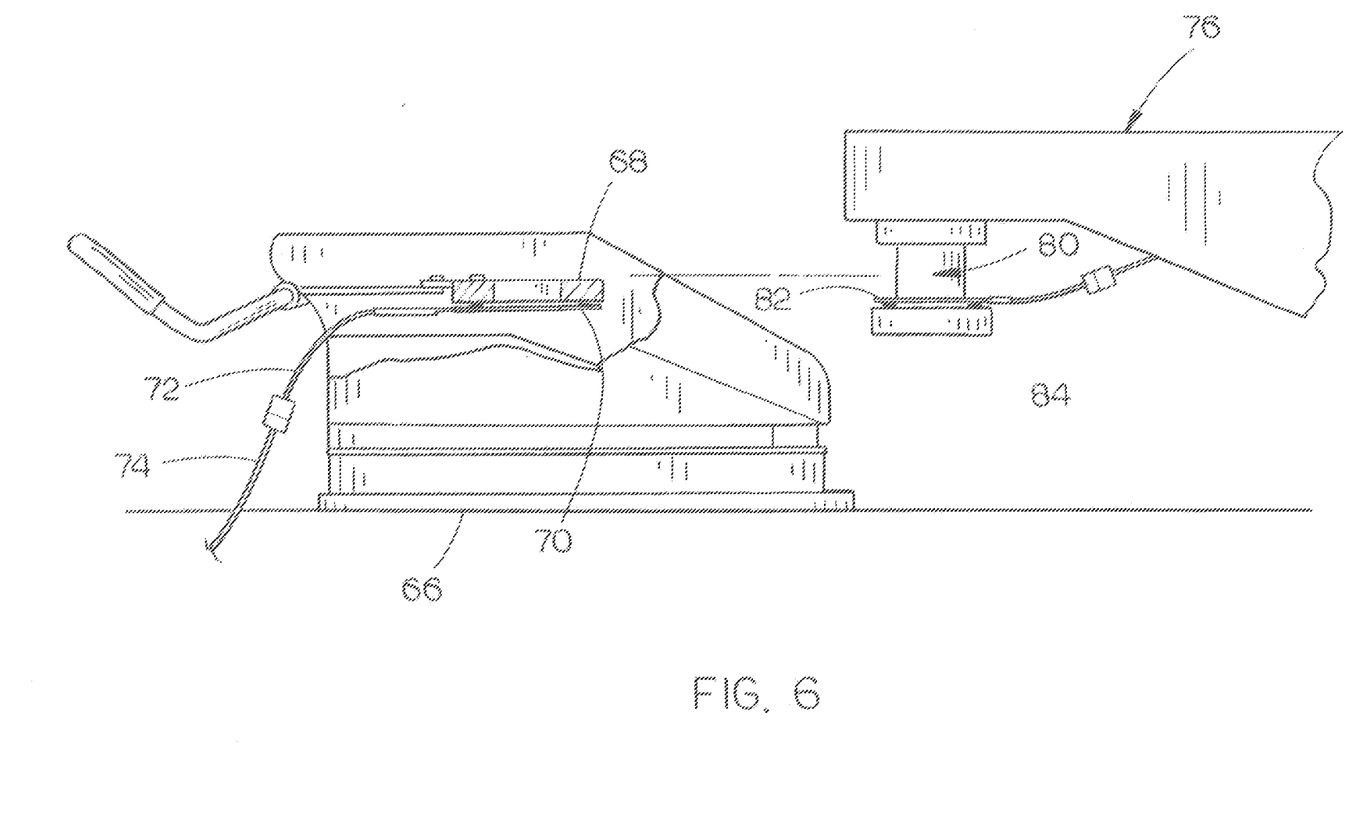
FIG. 6 is a side view of the apparatus of FIG. 5 with portions thereof cut-away to more fully illustrate the invention.

A modified version of the invention is shown in FIGS. 5 and 6 which enables electrical current from a vehicle fifth wheel to a trailer having a kingpin. In FIG. 5, the numeral 64 refers to a conventional fifth wheel mounted on a vehicle 66. A first semi-ring shaped electrical contactor support 68 is secured to the fifth wheel 64 and has electrical contacts 70 at the underside thereof which are connected to the electrical system of the vehicle by leads 72 and 74.

The numeral 76 refers to a conventional trailer having a kingpin 80 at its lower forward end. An electrical contactor 82 is positioned on the enlarged lower end 84 of kingpin 80 and is electrically insulated therefrom. The electrical contactor 82 has electrical contacts 86 thereon which are electrically connected to the trailer electrical system by leads 88 and 90. When kingpin 80 is received by the fifth wheel 64, the electrical contacts 70 are in electrical contact with the electrical contacts 86 so that electrical power from the vehicle is supplied to the trailer.

Figure 7:
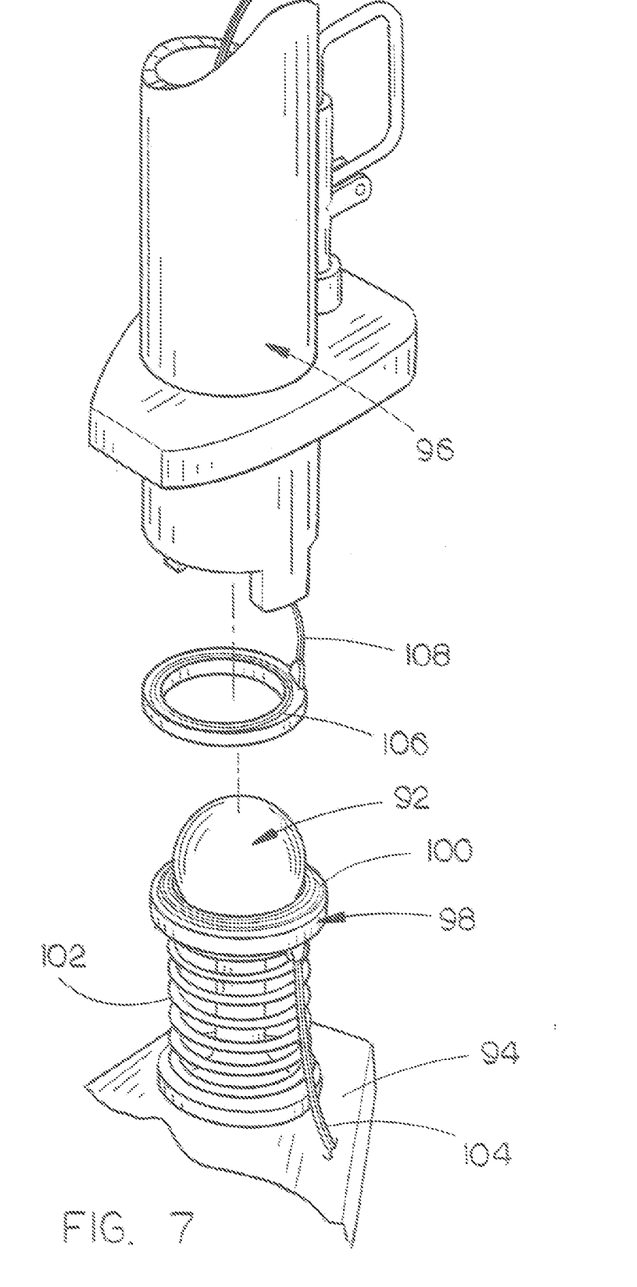
FIG. 7 is an exploded perspective view of a third embodiment of the invention which enables electrical power to be transferred between a vehicle having a gooseneck hitch structure.
Figure 8:
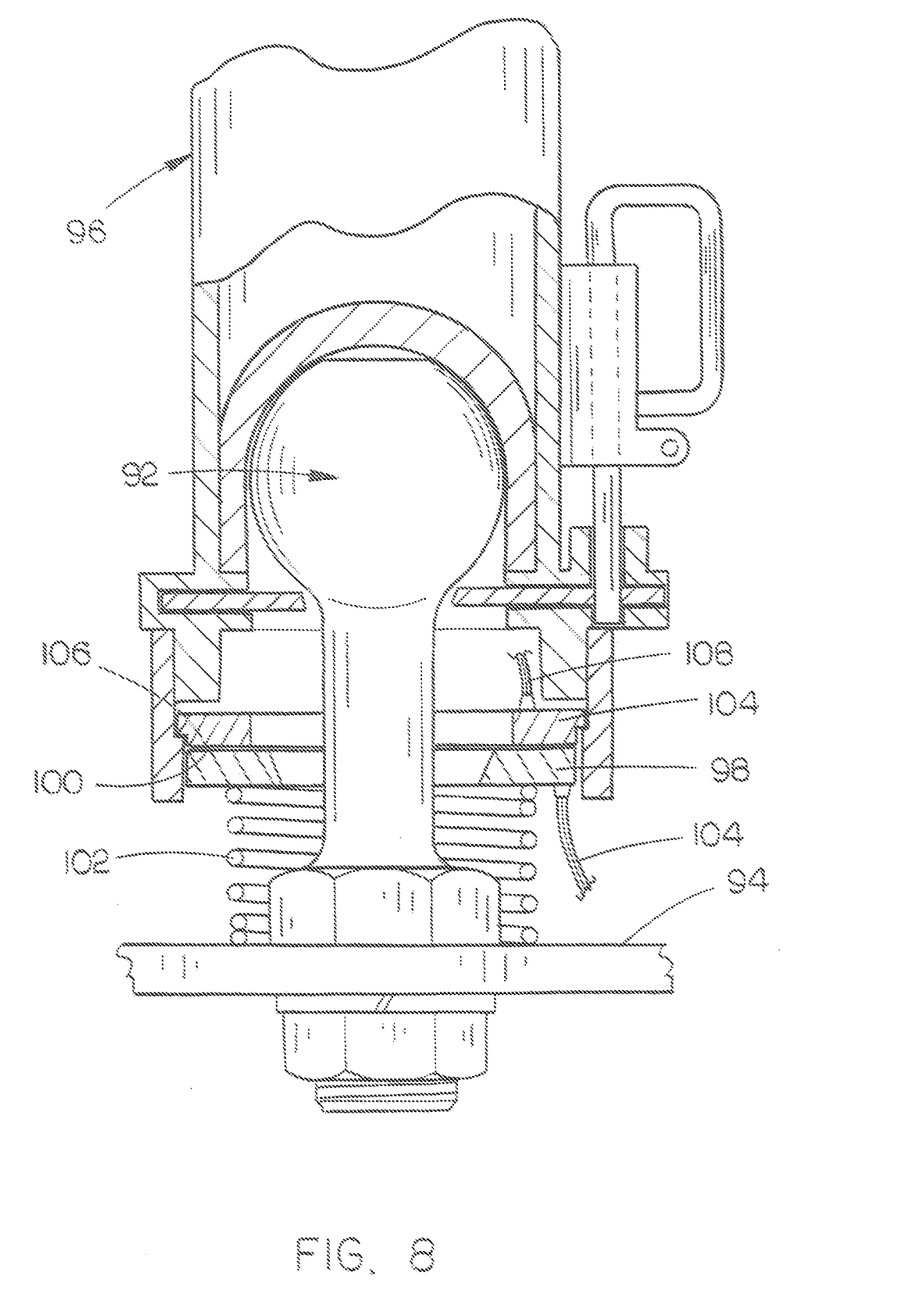
FIG. 8 is a sectional view of the apparatus of FIG. 7.

A third embodiment of the invention is illustrated in FIGS. 7 and 8 which depict the method of supplying electrical current from a vehicle having a gooseneck hitch ball 92 extending upwardly from the bed 94 of the vehicle to the trailer having a gooseneck hitch 96 extending downwardly from the forward end of the trailer. A ring-shaped electrical contactor 98 is vertically movably positioned on the hitch ball 92 below the ball portion thereof as illustrated in FIGS. 7 and 8. Contactor 98 includes an electrical contact or contacts 100 on the upper side thereof. Contactor 98 is yieldably urged to its upper position by the coil spring 102. The electrical contacts 100 are electrically connected to the vehicle electrical system through lead 104.

A ring-shaped electrical contactor 104 is positioned within the lower end of hitch 96 and has electrical contacts 106 mounted thereon which are exposed on the lower end thereof. The electrical contacts 106 are electrically connected to the trailer electrical system by lead 108. When gooseneck hitch 96 is connected to hitch ball 92, as seen in FIG. 8, the electrical contacts 106 of contactor 104 are in electrical engagement with the electrical contacts 100 of contactor 98 so that electrical power from the vehicle is transmitted to the trailer electrical system.

Figure 9:
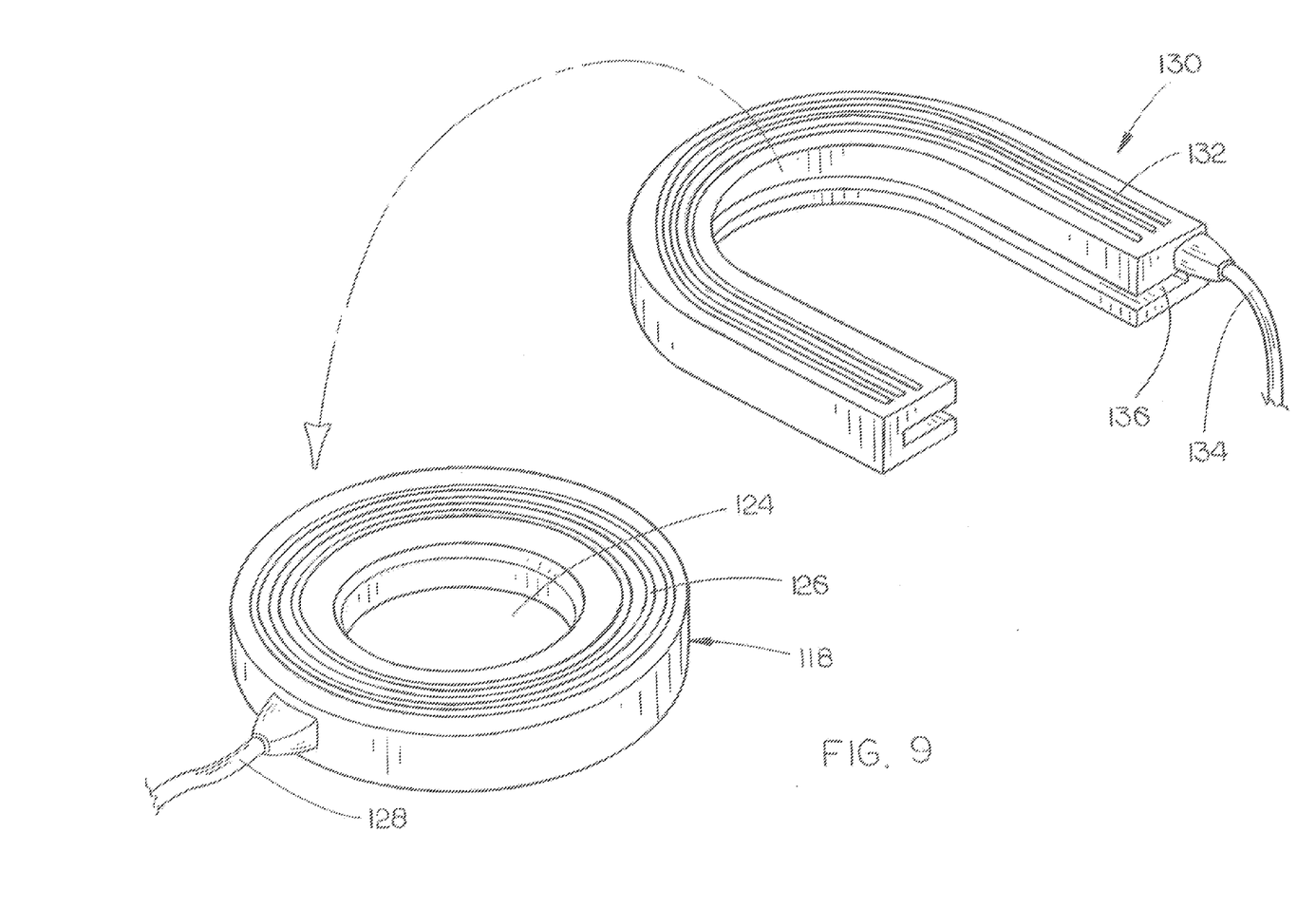
FIG. 9 is a partial perspective view of a fourth embodiment which is a modification of the first embodiment of FIGS. 1-4.
Figure 10:
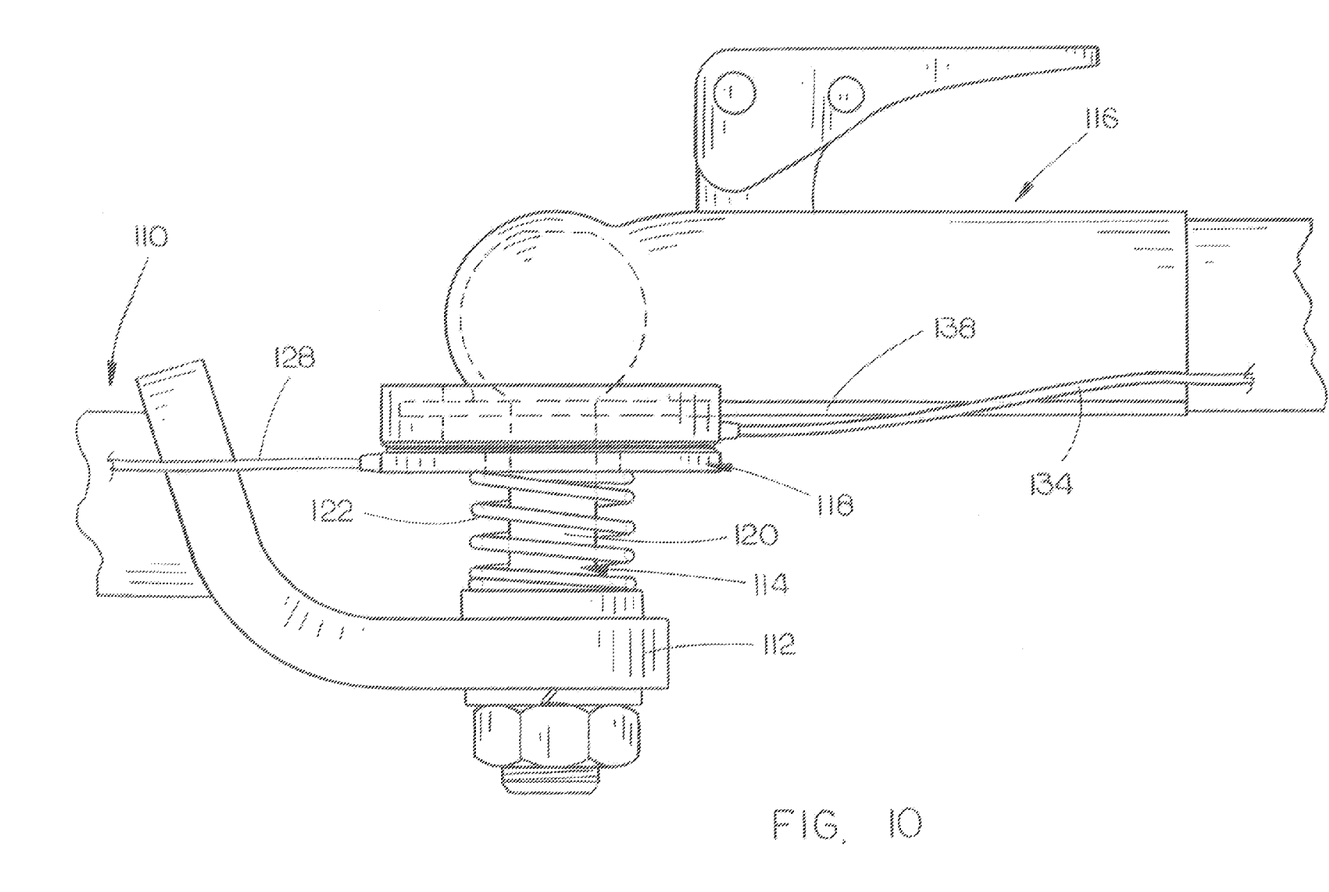
FIG. 10 is a partial side elevational view of the fourth embodiment.

A fourth embodiment of the invention is illustrated in FIGS. 9 and 10. In FIG. 10, the numeral 110 refers to a conventional vehicle receiver hitch having a horizontally disposed portion 112 at the rearward end thereof. Hitch ball 114 is mounted on the horizontally disposed portion 112 in conventional fashion. The numeral 116 refers to a conventional coupler 16 located at the forward end of a trailer hitch.

A contactor block or plate 118 is vertically movably mounted on the shank portion 120 of hitch ball 114 and is yieldably maintained upwardly by a spring 122 which embraces the shank portion 120 of the hitch ball 114. As seen in FIG. 9, contactor block or plate 118 has a central opening 124 formed therein which receives the shank portion 120 of the hitch ball 114. The upper surface of contactor block or plate 118 has a plurality of electrical contacts 126 provided thereon which are connected to the vehicle electrical system by lead 128.

The numeral 130 refers to a generally U-shaped contactor plate or block having electrical contacts 132 provided on the lower surface thereof which are electrically connected to the trailer electrical system by lead 134. As seen in FIG. 9, the contactor plate 130 has a U-shaped groove or recess 136 formed therein which receives the laterally extending flange portion 138 of the coupler 116. The contactor plate 130 is clamped onto the flange 138 or secured thereto by any convenient means.

In operation, the spring 122 yieldably urges contactor plate 118 upwardly into electrical engagement with the contactor plate 130. The fact that the contactor plates 118 and 130 are mounted as shown permits the vehicle hitch and the trailer coupler 116 to pivot and rotate with respect to one another.

Thus it can be seen that an improved means has been provided for electrically connecting a vehicle electrical system to a trailer by way of the hitch structures thereon. The means of this invention automatically electrically connects the vehicle electrical system to the trailer electrical system when the trailer hitch is mounted on the vehicle hitch. Thus, when the trailer is disconnected from the vehicle hitch, the electrical connection between the vehicle electrical system and the trailer electrical system is automatically disconnected. Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:
1. In combination:
a vehicle including an electrical system and a fifth wheel hitch having an upper side, a lower side, a forward end and a rearward end;
said fifth wheel hitch having a kingpin receiving opening formed therein which has forward and rearward ends;
a first semi-ring shaped electrical contactor support secured to said lower side of said fifth wheel support at said forward end of said kingpin receiving opening;
said first electrical contactor support having an upper side and a lower side;
said lower side of said first electrical contactor support having electrical contacts thereon which are electrically connected to the vehicle electrical system;
a trailer having a fifth wheel kingpin having upper and lower ends, extending downwardly therefrom for selective connection to said fifth wheel hitch on said vehicle;
said kingpin having an enlarged ring-shaped lower end with upper and lower sides;
a second contactor, having upper and lower sides, mounted on said upper side of said ring-shaped lower end of said kingpin;
said second contactor having electrical contacts on said per side thereof which are electrically connected to electrically powered components on the trailer;
said electrical contacts on said second contactor being positioned below said electrical contacts on said first electrical contact support and being in electrical contact therewith when said kingpin is hitched to said fifth wheel hitch to supply electrical power to the trailer from the vehicle.

* * * * *